Feb. 5, 1924.

H. J. BURR 1,482,731

STAMP AFFIXING AND ENVELOPE SEALING MACHINE

Filed Aug. 19, 1920    8 Sheets-Sheet 1

Fig.1.

INVENTOR
Harry J. Burr
by Brown & Seward
ATTORNEYS

Feb. 5, 1924.

H. J. BURR 1,482,731

STAMP AFFIXING AND ENVELOPE SEALING MACHINE

Filed Aug. 19, 1920    8 Sheets-Sheet 4

INVENTOR
Harry J. Burr
BY
ATTORNEYS

Feb. 5, 1924.

H. J. BURR 1,482,731

STAMP AFFIXING AND ENVELOPE SEALING MACHINE

Filed Aug. 19, 1920  8 Sheets-Sheet 5

INVENTOR
Harry J. Burr
BY
ATTORNEYS

Feb. 5, 1924.
H. J. BURR
1,482,731
STAMP AFFIXING AND ENVELOPE SEALING MACHINE
Filed Aug. 19, 1920     8 Sheets-Sheet 7

INVENTOR
Harry J. Burr
BY
ATTORNEYS

Patented Feb. 5, 1924.

1,482,731

UNITED STATES PATENT OFFICE.

HARRY J. BURR, OF NEW HARTFORD, NEW YORK, ASSIGNOR TO POSTCRAFT COMPANY, INC., OF UTICA, NEW YORK, A CORPORATION OF NEW YORK.

STAMP-AFFIXING AND ENVELOPE-SEALING MACHINE.

Application filed August 19, 1920. Serial No. 404,645.

*To all whom it may concern:*

Be it known that I, HARRY J. BURR, a citizen of the United States, and resident of New Hartford, in the county of Oneida and State of New York, have invented a new and useful Stamp-Affixing and Envelope-Sealing Machine, of which the following is a specification.

The object of my invention is to provide a stamp affixing and envelope sealing machine which is capable of rapidly handling the envelopes; means being provided for silencing either the stamp affixing mechanism or the envelope sealing mechanism so that the envelope may or may not be stamped and may or may not be sealed as it passes through the machine.

My invention includes a novel mechanism for feeding the envelopes one by one through the machine; a novel stamp affixing mechanism; a novel envelope sealing mechanism, and a novel control mechanism for silencing either of said stamp affixing or envelope sealing mechanisms.

A practical embodiment of my invention is represented in the accompanying drawings, in which.

The machine casing comprises the sides 1 and 2, the ends 3 and 4 and the top 5.

The envelope magazine comprises the fixed wall 6 uprising from the side wall 2, the swinging back wall 7, the longitudinally adjustable front wall 8 and the laterally adjustable side wall 9, so that the magazine can be adjusted for envelopes of different widths and lengths.

The back wall 7 is hinged on a cross-bar 10 supported at one end in the side wall 6 and at its other end in an upward extension 11 of the side wall 1 of the casing. The bottom of this back wall 7 is spaced a little distance from the top 5 of the casing. A vertically yielding gate 12 closes the space between the bottom of the back wall 7 and the top of the casing, which gate is provided with arms 13, pivoted on the feed roller shaft 14. A spring 15 is interposed between the gate 12 and a lug 16 pivoted on the cross-bar 10, which spring surrounds a bar 17 which extends upwardly from the gate 12, through the said hinged lug 16. The bottom of this gate 12 is inclined rearwardly and downwardly as shown.

The front wall 8 of the magazine is provided with a rearwardly extended horizontal portion 18 resting on the top 5 of the casing.

This front wall 8 is further provided with an inclined portion 19 near its bottom, tending to direct the lowermost envelopes in the magazine, rearwardly under the inclined bottom of the gate 12.

The adjustable side wall 9 is provided with a horizontal portion 20 which rests upon the horizontal portion 18. The top 5 of the casing is provided with a longitudinally arranged elongated slot 21 and the horizontal portion 20 of the adjustable side wall 9 is provided with a transversely elongated slot 22. A bolt 23 extends through both of these slots and tends to yieldingly hold the front wall 8 and side wall 9 in their adjusted positions, by providing the bolt with a spring pressed collar 24, loosely mounted on the bolt, a spring 25 being interposed between said collar and the nut 26.

The device for feeding the envelopes one by one from the magazine comprises the transversely arranged rotary shaft 27, which is provided with a hub 28 having a yielding segment 29 arranged to project through a slot 30 in the top 5 of the casing into engagement with the bottom envelope to feed the same into engagement with the gate 12. This yielding segment 29 is preferably provided with a friction cushioned surface 31. Opposite the yielding segment 29, the hub 28 is provided with a pair of segments 32, 33, the segment 32 being arranged to pass through the slot 30 and the segment 33 to pass through the slot 34, into engagement with the bottom envelope and lift the gate 12 sufficient to force the advance edge of the envelope through the gate.

These segments 32, 33 are preferably provided with friction cushioned surfaces 35, 36 having peripheral ribs 37, 38.

The devices for feeding the envelopes through the machine are arranged at three different points, one device being located between the magazine and the stamp affixing mechanism, one device being located between the stamp affixing mechanism and the envelope sealing mechanism and one device being located to the rear of the envelope sealing mechanism at the discharge end of the machine. The first envelope forwarding device comprises coacting rollers 41, 42 carried by the transverse shafts 14 and 43 respectively, located above and below the top 5 of the casing. The second envelope forwarding device comprises the coacting rollers 44, 45 mounted on the shafts 46, 47 respectively, located above and below the top 5 of the casing. The third envelope forwarding device comprises the coacting rollers 48, 49 mounted on the shafts 50, 51 respectively, located above and below the top 5 of the casing. In the present instance, the upper cross shafts 14, 46 and 48 are mounted at their ends in yielding bearings 52 of any well known or approved form. The main shaft is divided into two alined sections 53, 54, which shaft extends across the machine and is suitably mounted in the sides 1 and 2 of the casing. A clutch is arranged to lock and release the alined main shaft sections 53, 54, one member 55 of the clutch being fast on the section 53 and the other member 56 of the clutch being fast on the section 54. The section 53 of the main shaft is provided exterior to the side 1 of the casing with a suitable crank handle 57.

The shafts 43 and 47 of two of the envelope forwarding devices are driven from the main shaft by a chain and sprocket connection, the chain being denoted by 58, the sprocket on the main shaft section 53, by 59 and the sprockets on the shafts 43 and 47, by 60 and 61 respectively. The shaft 27 of the device for feeding the envelopes from the magazine is driven from the shaft 43 through the train of gears 62, 63, 64. The envelope forwarding device at the discharge end of the machine is driven from the shaft 47 through the train of gears 65, 66, 67. The shafts 14, 46 and 50 of the three upper envelope forwarding rolls are driven from the shafts 43, 47 and 51 of the lower envelope forwarding rolls by the gears 68, 69, 70, which mesh respectively with the gears 62, 65 and 67.

The stamp affixing mechanism is constructed, arranged and operated as follows:—

A supplemental casing 71 is attached to the side 2 of the main casing, which supplemental casing encloses the gears hereinbefore described. This supplemental casing also forms, together with an upwardly extended portion 72 of the side 2, bearings for a drum shaft 73, which drum shaft is provided with a gear 74 within the supplemental casing. This gear 74 meshes with a gear 75 fixed to the main shaft section 54.

A stamp drum 76 is fixed to the shaft 73, the hub 77 of which drum is connected to the periphery of the drum intermediate its ends by a web 78.

A roll of stamps 79 in ribbon form is carried by a core 80 mounted on the hub 77 of the drum. The periphery of the drum is divided to form a slot 81 through which the stamp ribbon passes. Adjacent to the slot 81, the periphery of the drum is provided with a roughened exterior surface 82.

Immediately back of the web 78 of the drum the shaft 73 is provided with an eccentric 83 on which is mounted to oscillate the stamp advancing lever 84. This lever is provided with an arm 85 which carries a stud or roller 86 in position to travel along the surface of an internal cam 87 fixed to the extension 72 of the side 2 of the main casing. This advancing lever is also provided with an arm 88, the free end of which is provided with two branch arms 89, 90, which project forwardly from the arm 88 through a cut-away portion 91 in the web 78 at the periphery of the drum, into the plane of the stamp ribbon. The stamp ribbon passes outside of the arm 89 and inside of the arm 90. A plate 92 is secured to the inside face of the forwardly projecting arm 89, which plate extends along the drum to a point beyond the forwardly extended arm 90 where the said plate is provided with a tongue 93 which extends through the slot 81 in the periphery of the drum. A spring 94 is secured to the forwardly extended arm 89 and is interposed between the plate 92 and the forwardly extended arm 90 for the purpose of exerting pressure upon the stamp ribbon which passes between the said spring and the inner face of the said forwardly projecting arm 90. A coil spring 95 has one end engaged with the eccentric 83 and the other end engaged with the stamp advancing lever for yieldingly holding the lever at the limit of its forward movement, the stationary cam 87 when engaging the stud or roller 86, serving to swing the stamp advancing lever rearwardly against the tension of the said spring 95.

The stamp severing lever 96 is pivoted at 97 to the back wall of the web 78 of the drum, the free end of this lever being provided with a laterally turned portion forming a stamp severing knife 98 which is located in front of and normally against the periphery of the drum adjacent to the roughened portion 82 at the slot 81 through the periphery of the drum. A spring 99 serves to yieldingly hold the knife 98 in its retracted position. The stamp advancing lever is provided with a shoulder 100 which is arranged to be brought into engagement with the stamp serving lever 96 by the coaction of the cam 87 with the stud or roller 86 to swing the lever 96 against the tension of its spring 99 to move the stamp severing knife 98 a short distance away from its seat to sever the leading stamp.

A stationary device 101 is secured within the supplemental casing 71 in position to fold over the leading stamp of the ribbon after it has been projected from within the drum subsequent to the severing of the previously folded over stamp. This device is provided with a slot 102 to permit the free passage of the projecting tongue 93, carried by the plate 92 of the stamp advancing lever.

The means for moistening the folded over stamp comprises a reservoir 103 extending across the machine, said reservoir being provided with a wick 104 for engaging the back of the stamp at a point immediately before the stamp severing and affixing point.

The clutch member 56 carried by the main shaft section 54 is provided with an outwardly pressed yielding segment 105 having one end hinged to the said clutch member at 106. This segment travels along a roller 107 as it approaches the periphery of the drum, the free end of the segment being released to allow it to spring outwardly into frictional engagement with the drum at the time of affixing the stamp. The means which I have shown for yieldingly forcing the segment 105 outwardly is a spring pressed plunger 108 slidable in the clutch member 56.

I will now proceed to describe the cycle of operations in the feeding, severing and affixing of a stamp:—

Figure 15:
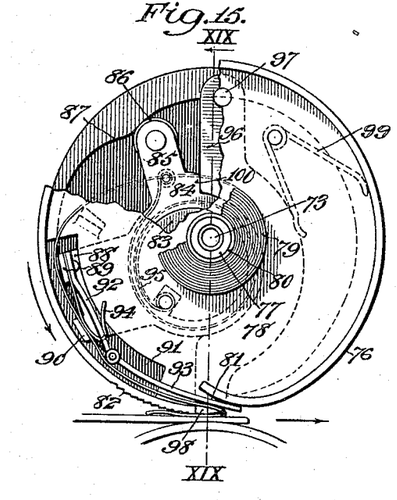
Fig. 15 represents a detail front view on an enlarged scale of the stamp affixing mechanism, with the parts in the positions which they assume just before the leading stamp is affixed to the envelope, certain of the parts being broken away to more clearly show the parts back of the same.
Figure 16:
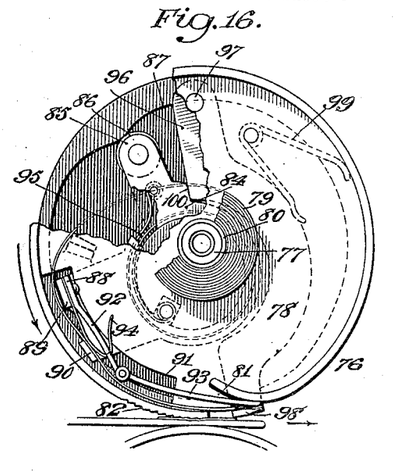
Fig. 16 represents a similar view showing the positions of the parts after the stamp has been affixed to the envelope and severed from the strip.
Figure 17:
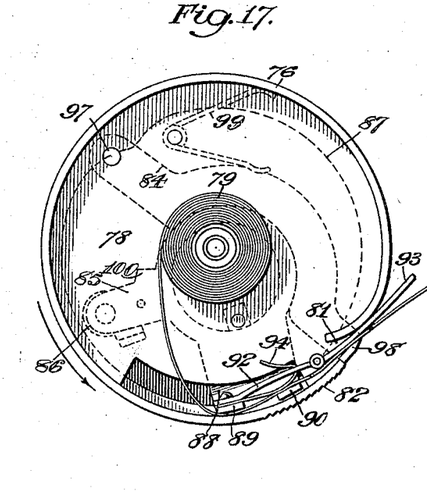
Fig. 17 represents a similar view with the parts in the positions they assume when the next succeeding stamp has been projected from the stamp drum.
Figure 18:
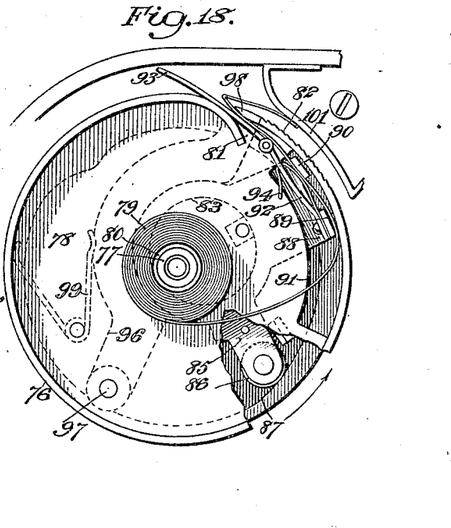
Fig. 18 represents a similar view with the parts in the positions they assume when the leading stamp has been folded over.
Figure 19:
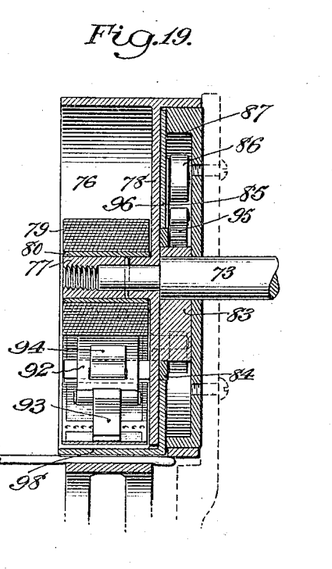
Fig. 19 represents a transverse vertical section taken in the plane of the line XIX—XIX of Fig. 15.
Figure 20:
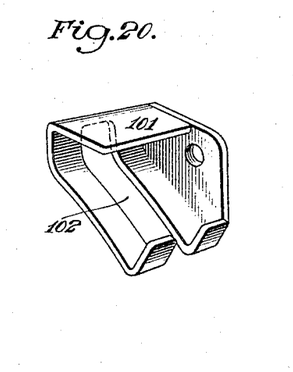
Fig. 20 represents the stamp folder in perspective.
Figure 21:
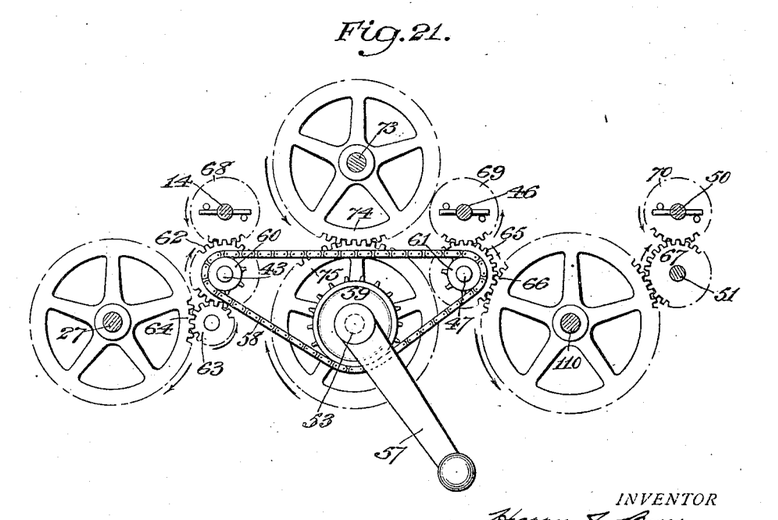
Fig. 21 represents a detail longitudinal vertical section showing the geared and driving connections between the several mechanisms.
Figures 22, 23, 24, 25:
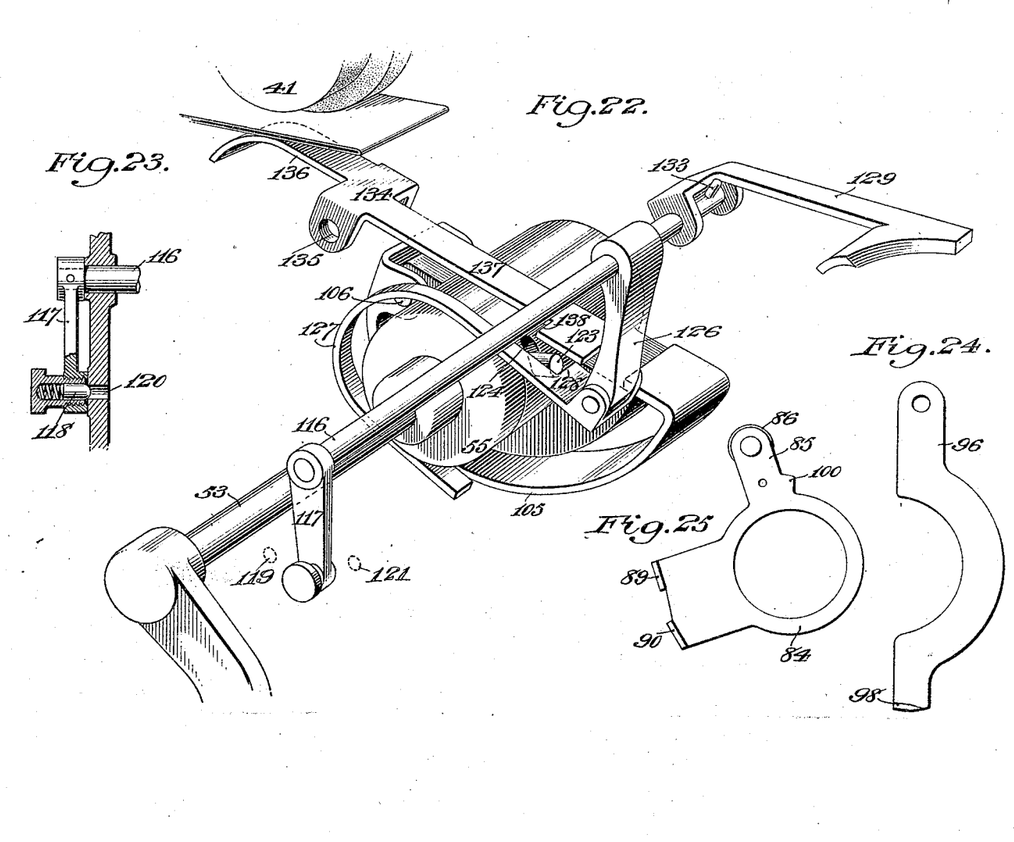
Fig. 22 represents a detail perspective view on an enlarged scale of the control mechanism.
Fig. 23 represents a detail section showing the control switch handle.
Fig. 24 represents a detail front view of the severing lever of the stamp affixing mechanism.
Fig. 25 represents a detail front view of the stamp feeding lever of the stamp affixing mechanism.

Presupposing the parts to be in the positions shown in Fig. 15 with a folded over stamp in engagement with the envelope and the stud or roller 86 of the stamp advancing lever about to engage the high spot on the cam 87; the next step in the rotary movement of the drum will cause the shoulder 100 on the stamp advancing lever 84 to swing the stamp severing lever sufficiently to cause the knife 98 to sever the stamp which is being affixed to the envelope. This step is shown in Fig. 16. The next step in the rotary movement of the drum will permit the stud or roller 86 to be released from the high spot on the cam 87, thus causing the spring 95 to swing the stamp advancing lever to the limit of its forward movement, thereby projecting the next succeeding stamp outwardly through the slot 81 with an over feed. This position of the parts is shown in Fig. 17. The next step in the rotary movement of the drum will cause the projected stamp to be engaged by the folding device 101 and thereby fold the said leading stamp. This position is illustrated in Fig. 18. The further rotary movement of the drum will bring this folded over stamp into position to be engaged by the moistening device just before the parts are again brought to the position illustrated in Fig. 15, when the cycle of operations will be repeated.

The envelope sealing mechanism is constructed, arranged and operated as follows:—

A reservoir 109 for the water is located near the discharge end of the machine between the sides 1 and 2 of the main casing. The cross shaft 110 on which the gear 66, hereinbefore mentioned is secured, is provided with a tapered moistening roll 111 which dips into the water in the reservoir 109. This moistening roll frictionally engages a horizontal disc 112, rotatably mounted on a vertical pin 113, depending from the top 5 of the casing. This disc has a tapered surface which engages the tapered periphery of the roll 111 and also engages the gummed flap of the envelope when the sealing device is in operation. A positive driving connection between the shaft 110 and the disc 112 is provided for by the bevel geared connection 114, 115.

The means for silencing either the stamp affixing mechanism or the envelope sealing mechanism or permitting the operation of both of these mechanisms is constructed, arranged and operated as follows:—

Figure 1:
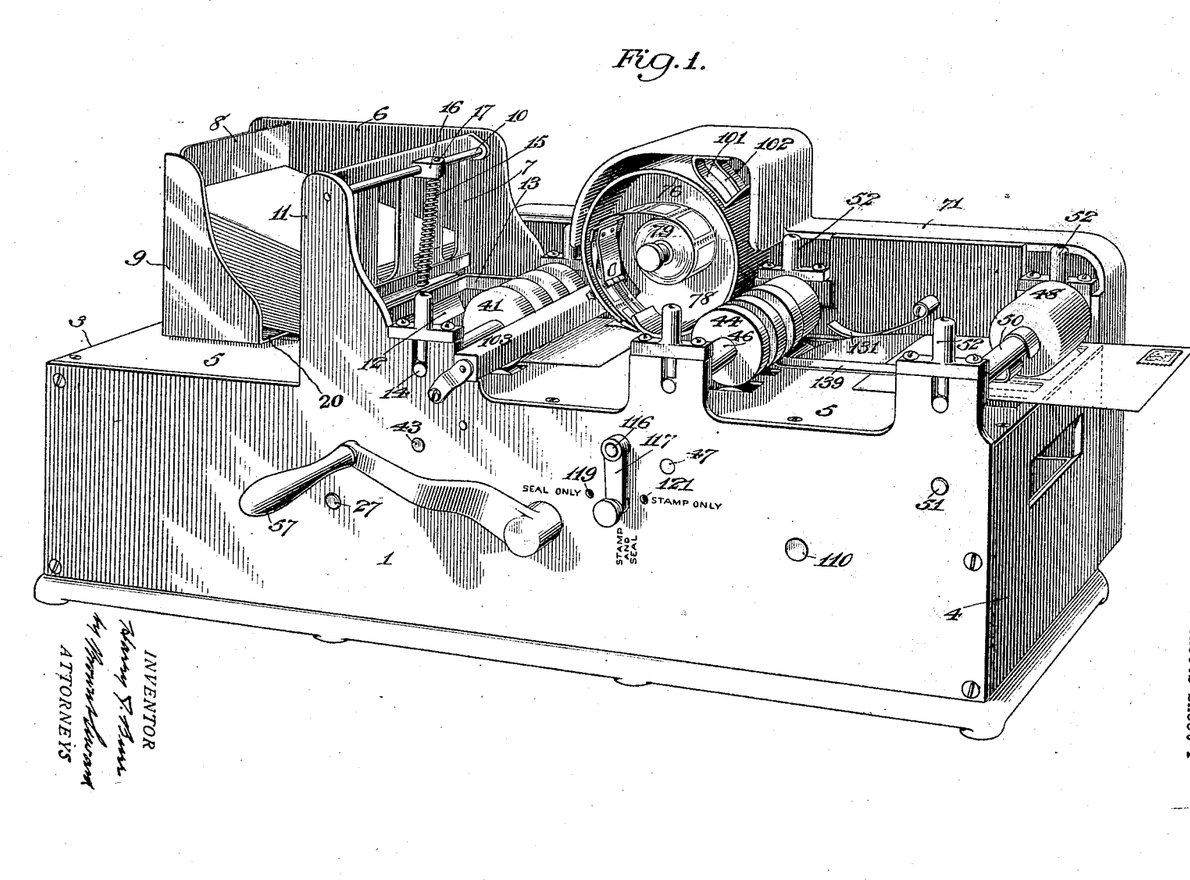
Fig. 1 represents the machine in perspective, the stamp affixing mechanism and the envelope sealing mechanism being both in operation.
Figure 2:
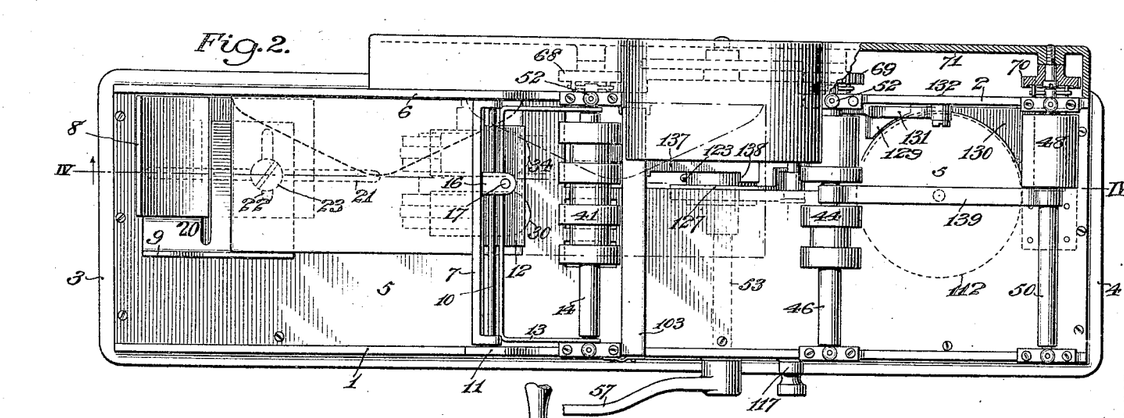
Fig. 2 represents the machine in top plan.
Figure 3:
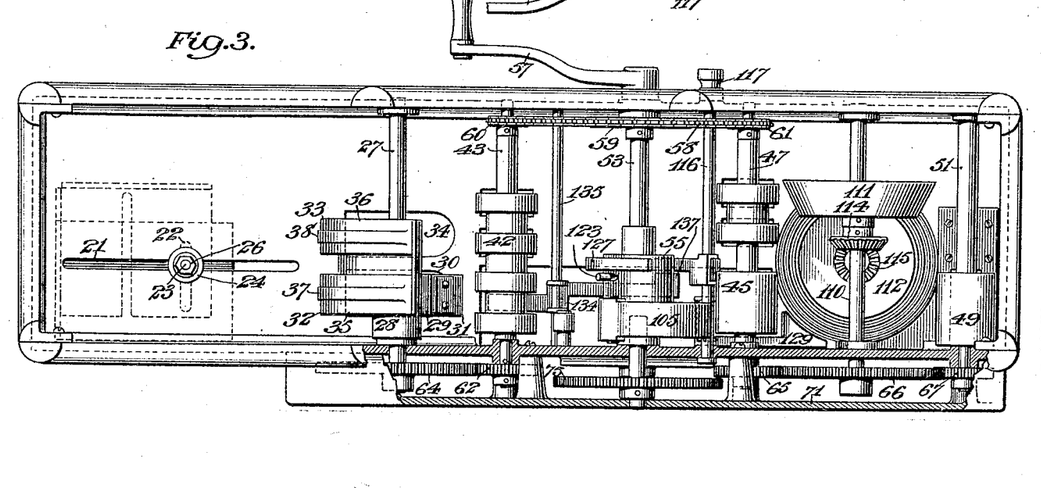
Fig. 3 represents the machine in bottom plan.
Figure 4:
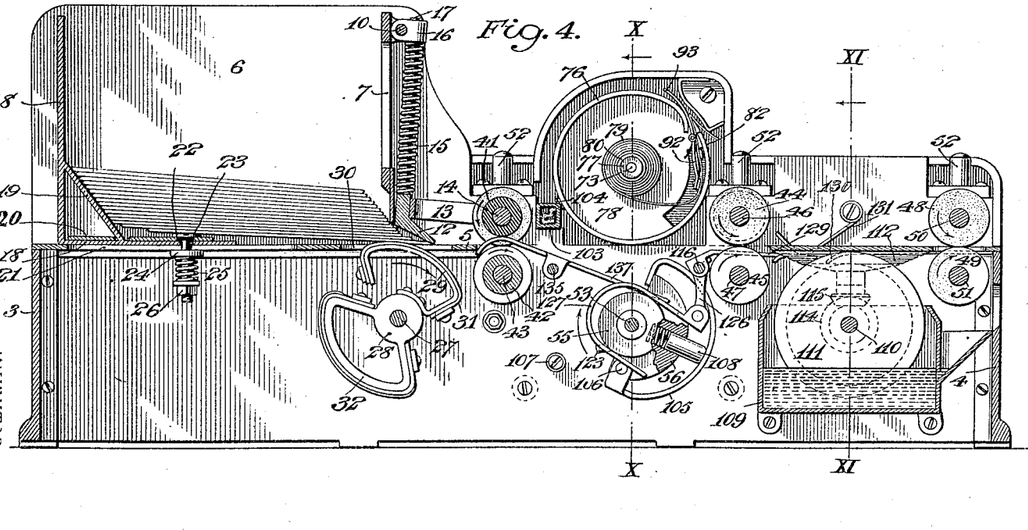
Fig. 4 represents a longitudinal vertical section taken in the plane of the line IV—IV of Fig. 2.
Figure 5:
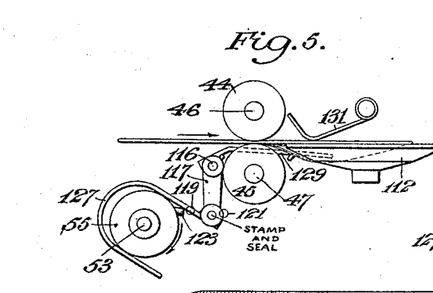
Fig. 5 represents a detail view showing the control switch moved into position to permit both the stamp affixing and the envelope sealing mechanisms to operate.
Figures 6, 7:
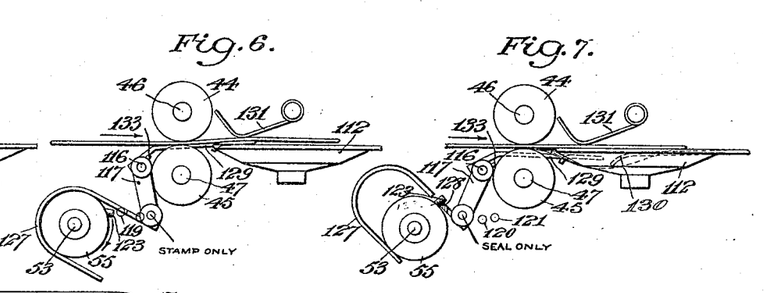
Fig. 6 represents a similar view showing the control switch moved into position to silence the envelope sealing mechanism.
Fig. 7 represents a similar view showing the control switch moved into position to silence the stamp affixing mechanism.
Figure 8:
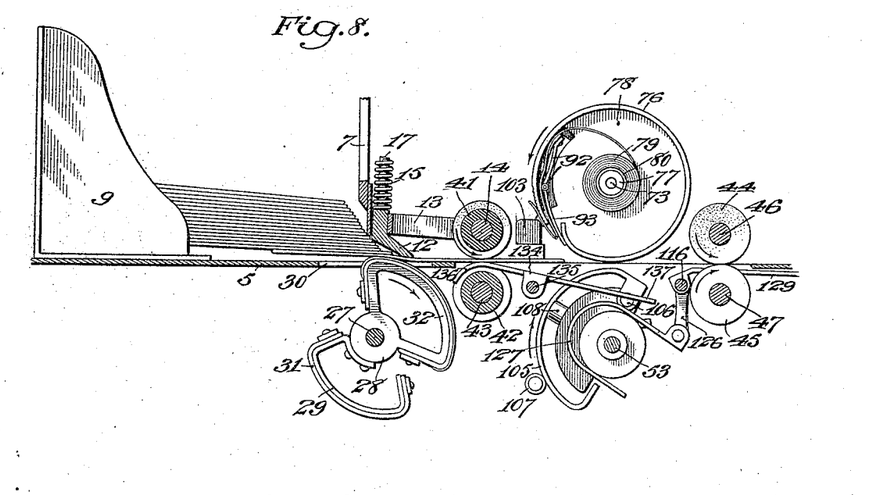
Fig. 8 represents a detail longitudinal vertical section showing the positions of the several parts as an envelope is about to pass into the stamp affixing mechanism.
Figure 9:
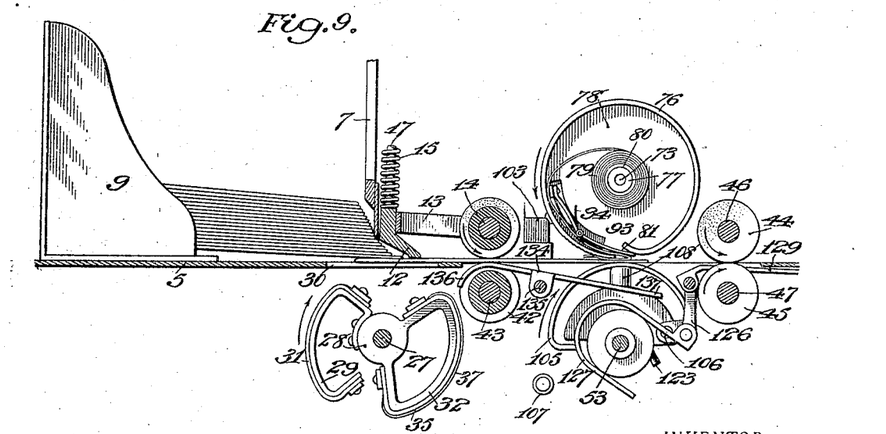
Fig. 9 represents a similar view showing the positions of the several parts after the envelope has passed into the stamp affixing mechanism.
Figures 10, 11, 12, 13, 14:
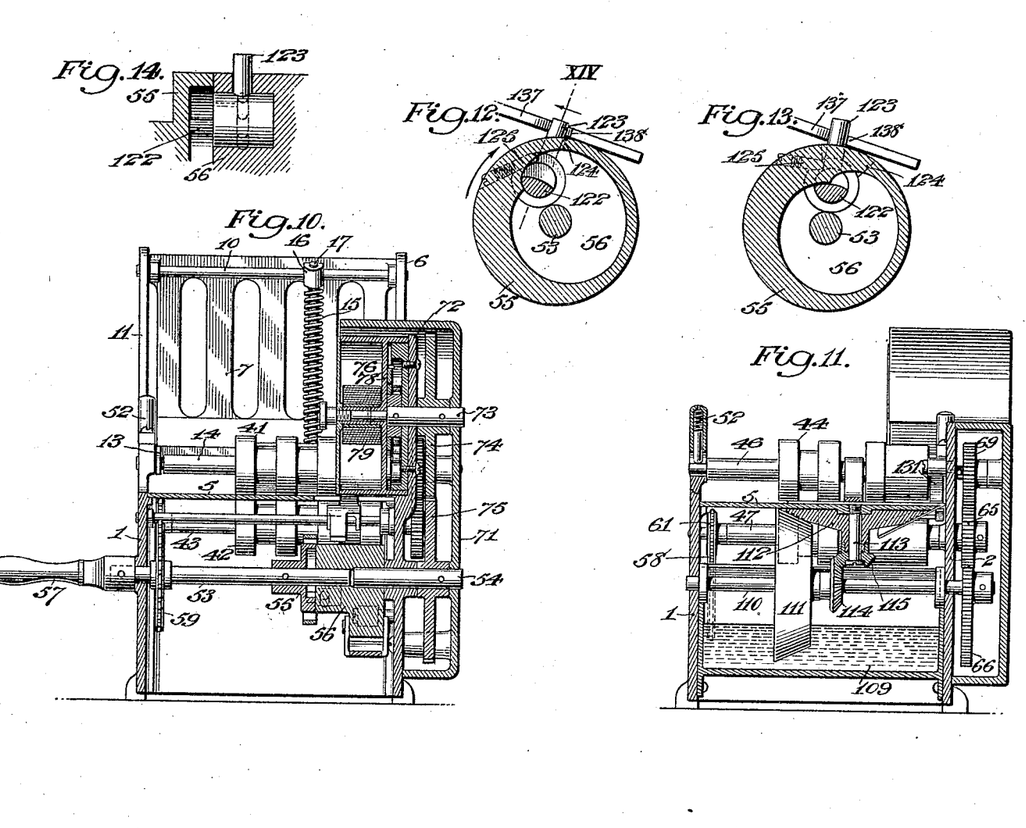
Fig. 10 represents a transverse vertical section through the machine taken in the plane of the line X—X of Fig. 4.
Fig. 11 represents a similar view taken in the plane of the line XI—XI of Fig. 4.
Fig. 12 represents a detail section on an enlarged scale through the control clutch in its locked position.
Fig. 13 represents a similar view with the control clutch in its unlocked position.
Fig. 14 represents a detail section taken in the plane of the line XIV of Fig. 12.

A rock shaft 116 is mounted in suitable bearings in the main casing, which shaft, exterior to the side 1 of the casing is provided with a switch handle 117, the free end of which is provided with a spring pressed plunger 118 arranged to snap into one of the three holes 119, 120, 121 as the handle 117 is swung into its three different positions. When the handle is swung into position to cause the plunger 118 to snap into the hole 119, the stamp affixing mechanism will be silenced. When the handle 117 is swung into position to cause the plunger 118 to snap into the hole 120, both the stamp affixing and the envelope sealing devices will be in operation. When the handle 117 is swung into position to cause the plunger 118 to snap into the hole 121, the envelope sealing mechanism will be silenced. The clutch member 56 which is fixed to the rotary main shaft member 54 has mounted therein a latch bolt 122 which is provided with a pin 123 projecting through an elongated slot 124 to the exterior of the clutch member 56. A spring pressed bolt 125 tends to yieldingly hold the pin 123 at the limit of its forward movement, and the projecting end of the bolt 122 in position to lock the clutch member 56 to the clutch member 55. When the pin 123 is forced rearwardly to the limit of its movement in that direction, the projecting end of the bolt 122 will be rocked into position to release the clutch member 56 from the clutch member 55. These two positions are shown in Figs. 12 and 13 respectively.

The rock shaft 116 of the switch is provided with a depending arm 126, the free end of which is provided with a loop 127, partly surrounding the clutch member 55, which clutch member forms a support for the said loop. This loop is provided with a laterally extended shoulder 128 arranged in the plane of the latch pin 123 of the clutch. When it is desired to silence the stamp affixing mechanism, the switch handle 117 is swung into position to bring the spring pressed plunger 118 into engagement with the hole 119, thereby causing the shoulder 128 on the loop 127 to force the pin 123 rearwardly to the position shown in Fig. 13, thereby stopping the rotation of the main shaft section 54 and the part driven thereby. When the switch lever 117 is in both of its other positions, the shoulder 128 of the loop 127 is moved out of the path of the pin 123.

A switch lever 129 is loosely mounted on the inner end of the rock shaft 116, the free end of the said lever being located in position to be raised above or dropped below the semi-circular edge of the portion of the top 5 of the main casing which is located over the moistening disc 112. It is to be understood that the top 5 is cut-away at this point to form this semi-circular edge so that the envelope flap may pass beneath the moistening disc while the body of the envelope passes over the top 5. A plate 130 is arranged adjacent to this semi-circular edge toward the discharge side of the machine for directing the envelope and its moistened flap between the pressure rollers 48, 49. A spring arm 131 is secured at 132 to the inside of the main casing. The free end of this spring arm engages the switch lever 129, tending to depress the same below the edge of the top 5. When the parts are in this position, the gummed flap of the envelope will be caused to travel underneath the moistening disc 112, while the main portion of the envelope will travel over the top 5. The switch arm 129 will be held in this depressed position when the switch handle 117 is swung to either the position for causing its spring pressed plunger 118 to enter the hole 119 or the hole 120. When the switch handle 117 is moved to bring the plunger 118 into engagement with the hole 121, a pin 133 carried by the switch shaft 116 will be caused to engage the switch lever 129 and raise the same so as to direct both the envelope body and the flap above the top 5 and out of engagement with the moistening disc 112, thereby silencing the envelope sealing mechanism.

I have provided means for preventing the affixing of a stamp unless an envelope be in position to have a stamp affixed thereto, which means is constructed, arranged and operated as follows:—

A two arm lever 134 is pivoted at 135. The forwardly projecting arm 136 of this lever is curved downwardly and it is interposed between the rollers of the first envelope forwarding device in the path of the incoming envelope. The rearwardly extended arm 137 of this lever is provided with a laterally extended shoulder 138 arranged in the plane of the latch pin 123. When no envelope is passing through the first envelope forwarding device, the arm 137 will be dropped into position to cause the shoulder 138 to be moved into the path of the pin 123, thereby swinging the pin backwardly into the position shown in Fig. 13 and thus silence the stamp affixing mechanism. The moment an envelope is fed to the first envelope forwarding device, its advance edge will depress the arm 136 and moving the shoulder 138 out of the path of the latch pin 123, causing the latch to automatically clutch the two main shaft sections together and render the stamp affixing mechanism operative.

A yielding guard 139 is supported by the shafts 46 and 50 and serves to guide the envelope from the second pair of forwarding rolls to the third pair of forwarding rolls.

From the above description it will be seen that a machine is provided which is adjustable to envelopes of different widths and lengths and in which the envelopes may be rapidly fed one by one from the magazine through the machine. The stamp affixing mechanism may be silenced at pleasure so that the envelopes are only sealed, as they pass through the machine; or the sealing mechanism may be silenced at pleasure, so that the stamps are only affixed to the envelopes as they pass through the machine.

It will also be seen that I have provided means for silencing the stamp affixing mechanism when no envelopes are fed through the machine, the said means also serving to properly position the advance edge of the envelope with respect to the movement of the stamp affixing mechanism so that the stamp will be affixed at the proper position on the envelope.

It is evident that various changes may be resorted to in the construction, form and arrangement of the several parts without departing from the spirit and scope of my invention; hence I do not wish to limit myself to the particular embodiment herein shown and described, but

What I claim is:—

1. In a machine of the character described, a stamp affixing mechanism, an envelope sealing mechanism including a flap moistening device, means for feeding envelopes through said mechanisms, and manually operated means for switching the envelope flaps around the moistening device at pleasure.

2. In a machine of the character described, a stamp affixing mechanism, an envelope sealing mechanism including a flap moistening device, means for feeding envelopes through said mechanisms, and manually operated means for rendering the stamp affixing mechanism ineffective or for switching the envelope flaps around the moistening device at pleasure.

3. In a machine of the character described, a stamp affixing mechanism, an envelope sealing mechanism including a flap moistening device, means for feeding envelopes through said mechanisms, manually operated means for rendering the stamp affixing mechanism ineffective or for switching the envelope flaps around the moistening device at pleasure, and automatic means controlled by the feeding or non-feeding of the envelopes for rendering the stamp affixing mechanism effective or ineffective.

4. In a machine of the character described, a stamp affixing mechanism, an envelope sealing mechanism including a flap moistening device, means for feeding envelopes therethrough, and means for switching the envelopes around the moistening device at pleasure, said means including a manually operated switch.

5. In a machine of the character described, a stamp affixing mechanism, an envelope sealing mechanism, means for feeding envelopes through said mechanisms and operating said mechanisms, said means including a clutch, and a switch for controlling the operation of the clutch to render the stamp affixing mechanism ineffective at pleasure, said switch also serving to render the sealing mechanism ineffective at pleasure.

6. In a machine of the character described, an envelope supply magazine, a stamp affixing mechanism, an envelope sealing mechanism, and means for feeding the envelopes from the magazine through the stamp affixing and envelope sealing mechanisms including a rotary segment for starting the envelope on its feeding movement, and an oppositely arranged rotary segment for thereafter continuing the feeding movement of the envelope, out of the magazine.

7. In a machine of the character described, a stamp affixing mechanism, an envelope supply magazine, a vertically yielding gate at the magazine outlet, and means for feeding the envelopes to the stamp affixing mechanism comprising a rotary segment coacting with the gate to feed the bottom envelope from the magazine.

8. In a machine of the character described, a stamp affixing mechanism, an envelope supply magazine, a vertically yielding gate and means for feeding the envelopes to the stamp affixing mechanism comprising oppositely arranged rotary segments coacting with the gate to start the bottom envelope on its way and thereafter positively feeding it out of the magazine.

9. A stamp affixing device including a drum adapted to contain a series of stamps in ribbon form, means for imparting a rotary movement in one direction only, to the drum, and means operable during the revolution of the drum to fold over the leading stamp, moisten the folded over stamp, detach and affix it to the envelope and project the next succeeding stamp from the drum into position to be folded over.

10. A stamp affixing device including a drum adapted to contain a series of stamps in ribbon form, means for imparting a rotary movement in one direction only, to the drum, and means operable during the revolution of the drum to fold over the leading stamp, moisten the folded over stamp, detach and affix it to the envelope and project the next succeeding stamp from the drum into position to be folded over, said means including a stamp feeding lever and a stamp severing lever carried by the drum, and a fixed cam for controlling the movement of the stamp feeding lever, the stamp severing lever being operated by the stamp feeding lever.

11. In a machine of the character described, a stamp affixing device, an envelope sealing device including a flap moistener, and means for feeding the envelopes through the stamp affixing device and the sealing device in contact with the moistener, and manually operated means for switching the envelope flaps around the moistening device at pleasure.

12. In a machine of the character described, a stamp affixing device, an envelope sealing device including a flap moistener, and means for feeding the envelopes through the stamp affixing device and the sealing device in contact with the moistener, and manually operated means for switching the envelope flaps around the moistening device at pleasure, said manually operated means including a switch arm, a switch handle and its shaft.

13. In a machine of the character described, a stamp affixing mechanism, a divided operating shaft for driving the same, a clutch between the shaft sections, and a device normally engaging the clutch to hold it out of its operative position, said device being automatically moved out of engagement with the clutch by the incoming envelope to allow the clutch to return to its operative position to permit the operation of the stamp affixing mechanism.

14. In a machine of the character described, a stamp affixing mechanism, a divided operating shaft for driving the same, a clutch between the shaft sections, an envelope forwarding device, and a device normally engaging the clutch to hold it out of its operative position, said device being moved out of engagement with the clutch by the incoming envelope as it passes through the forwarding device to allow the clutch to return to its operative position to permit the operation of the stamp affixing mechanism.

15. In a machine of the character described, a stamp affixing mechanism, a divided operating shaft for driving the same, a clutch between the shaft sections, and a manually operated switch shaft having a device for engaging the clutch to control its operation.

In testimony, that I claim the foregoing as my invention, I have signed by name this 17th day of August, 1920.

HARRY J. BURR